United States Patent Office 3,748,149
Patented July 24, 1973

3,748,149
CONTINUOUS PRODUCTION OF CHEESE CURD
Homer E. Walter, 15508 Tierra Drive, Silver Spring, Md. 20906, and Arthur M. Sadler, R.F.D. 1, Box 439, Annapolis, Md. 21221
No Drawing. Continuation-in-part of abandoned application Ser. No. 859,007, Sept. 18, 1969. This application Feb. 14, 1972, Ser. No. 226,282
Int. Cl. A23c 19/02
U.S. Cl. 99—116       1 Claim

ABSTRACT OF THE DISCLOSURE

Liquid in the form of predetermined sized particles is sprayed into a coagulating chamber in which the atmosphere is saturated with steam. The temperature in the chamber ranges gradiently from 86 to 200° F., bottom to top, and is warm enough to coagulate the sprayed particles without destroying any bacterial organisms or enzymes within the particles. The coagulated curd is collected as a thin layer of discrete, uniformly-sized, ball-shaped particles thus eliminating the step of cutting the curd to effect exudation of whey.

---

A non-exclusive, irrevocable, royalty-free license in the invention herein described, throughout the world for all purposes of the United States Government, with the power to grant sublicenses for such purposes, is hereby granted to the Government of the United States of America.

This application is a continuation-in-part of our co-pending application for patent, Ser. No. 859,007, filed Sept. 18, 1969, now abandoned.

This invention relates to a process and apparatus for coagulating liquids and more particularly to a continuous flow process and apparatus for coagulating liquids. The process and apparatus are particularly suitable to the continuous flow formation of curd in the cheesemaking process.

Although the present invention is not limited to the production of cheese but can be used in the production of any product in which particle coagulation is an intrinsic part of the manufacturing process, the production of cheese is a well-known example of the need for a coagulating step. Briefly, cheesemaking involves the coagulation of milk or skim milk under controlled conditions followed by cutting the curd. The primary purpose of cutting the curd is to speed whey expulsion and assist in uniform cook-through of the curd by increasing surface area. Curd cutting increases the surface area many times. For example, the surface area of curd block 20 x 40 x 100 inches cut with ¼ inch wire knives increases more than 100 times. This leads to effective whey expulsion and permits the resulting equal size smaller curds to be cooked more uniformly throughout. The size of the cubes determines the moisture content of the cheese; larger cubes give a higher moisture content, smaller cubes a lower one.

Continuous flow processes for the production of cheese curd are exemplified in U.S. Pat. Nos. 2,917,827; 3,132,026; 2,781,269 and 3,132,026. However, in all of the available continuous flow methods the curd is formed while the liquid bulk is in a quiescent state. This is true even in those cases in which the liquid bulk is moving; in these cases the bulk as a whole is moving but there is no disturbance within the bulk while the curd is forming. In these processes any disturbance or vibration within the liquid bulk hinders the development of a homogeneous compact curd. In addition, the milk coagulates in the form of a gel to form the cheese curd thereby necessitating some means of cutting the curd.

Unlike presently available processes the present invention is a method of curd formation by particle coagulation and when applied to cheesemaking it produces discrete, uniformly-sized, ball-shaped uncut curd particles in a continuous flow. No cutting step is needed to separate the curd from the whey.

Accordingly, one object of the present invention is to provide a truly continuous flow process of curd formation.

Another object is to provide a continuous flow particle coagulating process which may be programmed to automatically control the sequence of operations and thereby minimize the amount of labor required, produce a more uniform product, and allow the use of a closed system equipped for automatic cleaning and sanitizing.

A further object is to provide a continuous flow curd forming process in which the curd cutting step is eliminated.

A still further object is to provide an apparatus system in which the foregoing objects can be accomplished.

In general, according to this invention, the foregoing objects are accomplished by a process in which the liquid to be coagulated is sprayed into a coagulating chamber in which the atmosphere is saturated with steam. The size of the sprayed particles is from 50 to 600 microns in diameter and is predetermined by adjusting or changing the spray nozzle. The temperature in the chamber is sufficiently warm to coagulate the sprayed particles without destroying the bacterial organisms or enzymes within the particles. The coagulated curd is collected in the form of a thin layer of discrete, uniformly-sized, ball-shaped particles by washing them with fresh water or with the supernatant whey onto an appropriate collecting means such as a conveyor belt. The fact that the particles are discrete and ball-shaped and that they are collected in a thin layer greatly facilitates separation of the remaining whey from the curd thus eliminating the step of cutting the curd to effect exudation of the whey. Another novel feature of this invention is that since the size of the particles entering the coagulating chamber can be set at any desired diameter from 50 to 600 microns and since each particle is exposed to the same atmospheric conditions in its descent to the bottom of the chamber and would thus lose about the same amount of whey, the size of the coagulated, ball-shaped curd particles can be predetermined fairly accurately. When the process is used to make cheese, prepared milk is sprayed as particles of predetermined size into the steam or coagulating chamber and the coagulated particles are collected on a conveyer belt as a synerized thin layer of discrete, uniformly-sized, ball-shaped particles of predetermined size.

As previously stated the process is not limited to the production of cheese but, since cheese is a well-known commodity, the process will be described as it relates to cheese making. Several modifications of a continuous flow process for the production of curd are possible using the process and apparatus of this invention. In all of the modifications fluid milk passes through a spray nozzle and the liquid particles of a predetermined size from 50 to 600 microns in diameter coagulate in their downward passage through a chamber in which the atmosphere is saturated with steam and in which the temperature ranges gradiently from 86 to 200° F., bottom to top, hereafter referred to as the steam or coagulating chamber and the coagulated particles are collected as heretofore described. Also, the temperature of the coagulated particles as they fall through the steam chamber is lower than that required to destroy bacterial organisms or enzymes within the particles.

In the first modification fermented milk is cooled to 32–86° F., sprayed into the chamber where the liquid particles coagulate and the coagulated curd particles collected.

In the second modification milk at a temperature range of 32–86° F. is partially fermented or cultured by the continuous addition of a viable bacterial culture to adjust the pH of the milk to 4.8–6.5, sprayed into the chamber where the particles coagulate and the coagulated curd particles collected. The viable bacterial culture is any type of organism grown in whole milk, skimmilk, reconstituted milk, milk whey, or media required for the manufacture of specific types of milk, whey or cheese curd into any specific type of cheese. Since these types of organisms are very well known in the art there is no need to list the various cultures available.

In the third modification milk cooled to 32–40° F. is automatically and continuously adjusted with acid to a pH of 4.3–5.0, sprayed into the chamber where the particles coagulate and the coagulated particles collected.

The first three process modifications involve the preparation of acid-heat coagulated curd. The fourth modification involves the use of milk coagulating enzymes to assist in coagulating the milk.

Milk is cooled to 32–40° F. and a coagulating enzyme is added. Coagulation will not occur at this temperature for 48 hours but at least three hours time is required to complete the enzymic action on the casein. The milk is then heated in a plate heater to 45–86° F., sprayed into the chamber to coagulate the particles and the coagulated particles collected.

The fifth modification is a variation of the second modification. A coagulating enzyme is added to milk and the milk is held at 32–40° F. for at least three hours. It is then partially fermented by the continuous addition of a viable bacterial culture until the pH of the milk is 5.2–6.5 after which it is heated in a plate heater to 55–86° F., sprayed into the chamber to coagulate the particles and the coagulated particles collected.

In the sixth modification milk is partially fermented by the addition of viable cultures until the pH of the milk is 5.6–6.5 and then cooled at 32–40° F. A coagulating enzyme is added and the milk allowed to stand for at least three hours before it is pumped into the processing system where acid is injected into the steam to adjust the pH to 4.4–6.0, after which the milk is warmed to 45–86° F. in a heat exchanger and then sprayed into the steam chamber to coagulate the particles and the coagulated particles collected.

The invention will be further described in reference to the drawing wherein:

The figure is a flow diagram to illustrate the continuous flow process of coagulating liquids and apparatus for such process.

Tank 2 is provided with an agitator 4 and a temperature sensing device 6 that activates valve and controller 8 to control the flow of temperature regulating fluid through pipe 10 into tank jacket 12 which in turn is provided with fluid outlet 14. The flow of liquid from tank 2 is controlled by valve 16 in line 18 which connects tank 2 to centrifugal pump 22. Centrifugal pump 22 is connected by line 24 to positive displacement pump 20 which is connected by line 26 to heat exchanger 28. Regulating valve and controller 30 for heat exchanger 28 is activated by temperature sensing device 31 in line 32. Line 32 connects heat exchanger 28 with pH cell 34 which in turn is connected by line 36 to nozzle 38 from which the liquid to be coagulated is sprayed as particles into steam chamber 40. The temperature in chamber 40 is controlled by steam regulating valve and controller 42 which is activated by temperature sensing device 43. Opening 44 at the bottom of chamber 40 allows the coagulated particles to drop onto controlled cooling time conveyor 46 from which they are transferred to belt conveyor 48 and then to hoop 50. Provision for adding other materials such as bacterial cultures and acids to the flowing stream of liquid is provided by line 52 which connects metering pump 54 to line 18 at a point adjacent to the entrance to centrifugal pump 22. The flow of material from storage tank 56 through pump 54 to lines 52 and 18 is controlled by transmitter 58 which receives and interprets the electrode potential from pH cell 34 and transmits an air signal to control the speed of pump 54.

The six modifications of a continuous flow process for the production of cheese curd previously described will be used to illustrate the operation of the apparatus.

In the first modification neither acid nor bacterial culture is added to the flowing stream of liquid. Consequently, metering pump 54, tank 56, and line 52 are not utilized. Milk that has been fermented by the addition of viable bacterial cultures is withdrawn from tank 2 by opening valve 16. The milk flows through line 18, pump 22, line 24, pump 20 and line 26 to heat exchanger 28 where the temperature of the flowing stream of liquid is adjusted to 32–86° F. The liquid then flows through line 32, pH cell 34, line 36 and is sprayed from nozzle 38 into steam chamber 40 where the liquid particles coagulate and synerize and then drop through opening 44 onto controlled cooling time conveyor 46 where the particles are formed into a curd mass and whey which is transferred to screen or perforated belt conveyor 48 through which most of the whey is drained off as it transports the curd mass to hoop 50.

The second modification is similar to the first except that a controlled amount of viable bacterial culture is introduced from tank 56 through pump 54 and line 52 into a flowing stream of untreated milk in line 18.

The third modification is also similar to the first except that the temperature of the untreated milk withdrawn from tank 2 is in the range of 32–40° F. and the pH of the milk as it flows through line 18 is automatically and continuously adjusted to between 4.3 and 5.0 by the addition of acid from tank 56 through pump 54 and line 52. The amount of acid added to the flowing stream is controlled by transmitter 58 which receives the electrode potential from pH cell 34.

In the fourth modification milk is cooled to 32–40° F. and a coagulating enzyme added. Enough time, at least 3 hours, is allowed for the enzyme to complete its action on the casein before the milk is withdrawn from tank 2. The process is then similar to the first modification except that the temperature of the flowing stream of milk is adjusted in heat exchanger 28 to 45–86° F. before it continues on to steam chamber 40.

The fifth modification is similar to the second except that the milk flowing from tank 2 is at 32–40° F. and has been treated for at least three hours with a coagulating enzyme. Then, as in the second modification, a controlled amount of viable bacterial culture is introduced from tank 56 through pump 54 and line 52 into the flowing stream of milk in line 18. Prior to being sprayed into steam chamber 40 the treated milk is warmed to 45–86° F. in heat exchanger 28.

In the sixth modification milk that has been partially fermented is cooled to 32–40° F. and then treated with coagulating enzymes for at least three hours prior to entering the processing system through valve 16. The pH of the flowing stream of milk is automatically adjusted to 4.4–6.0 by the addition of acid from tank 56 through pump 54 and line 52 and then the milk is warmed to 45–86° F. in heat exchanger 28 prior to being sprayed into steam chamber 40.

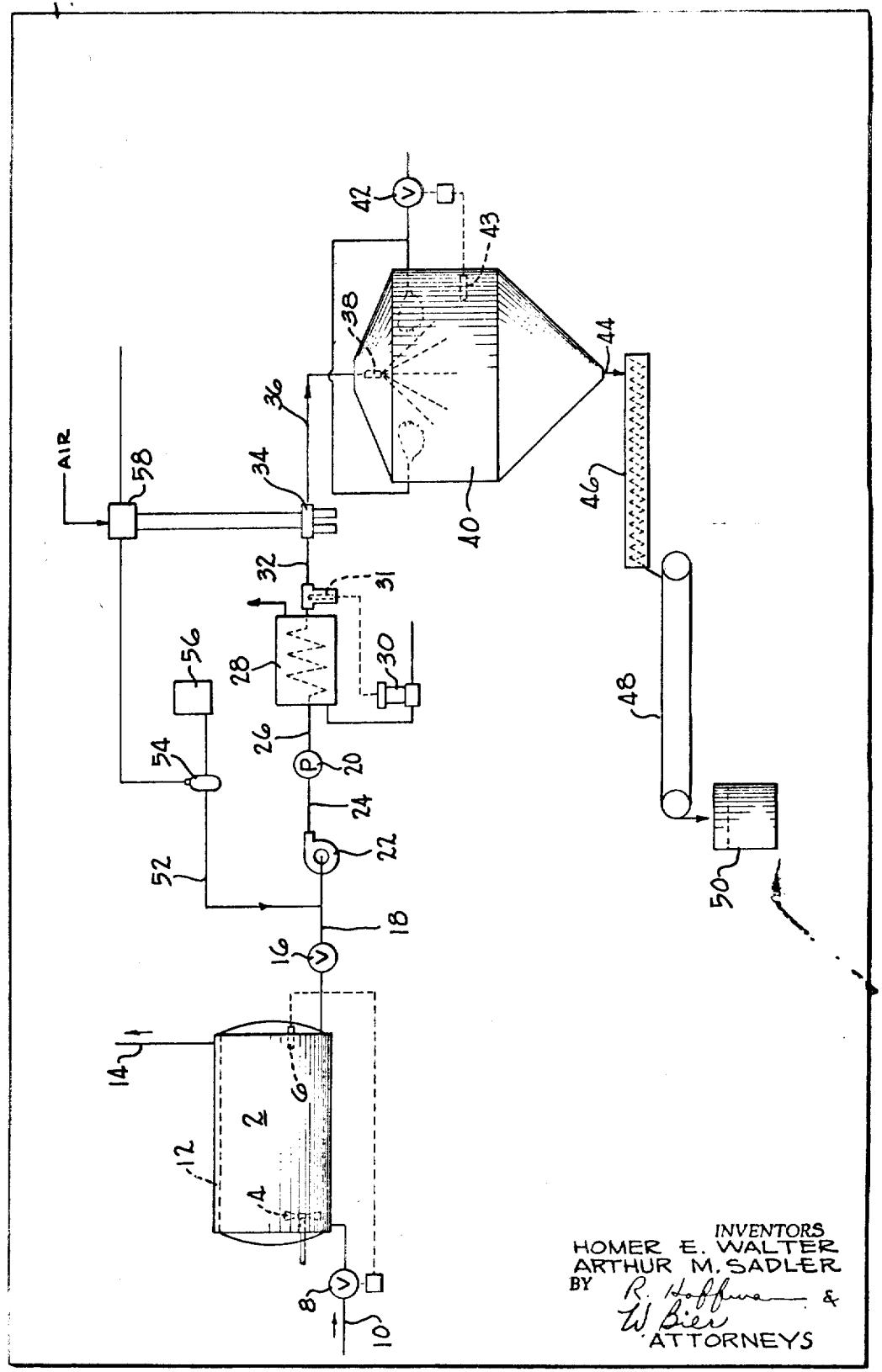

We claim:

1. In a continuous flow process for the production of cheese and wherein milk is introduced into a chamber in which the atmosphere is saturated with steam, said milk being introduced into the top of said chamber, coagulated in its descent through the chamber and the curd collected and separated from the whey, the steps comprising:
   (a) spraying the milk into the chamber as particles of predetermined size, each particle being the same size and within the range of from 50 to 600 microns in diameter;
   (b) providing means for exposing each particle to the same controlled atmospheric conditions and for each particle, in its descent through the chamber to coagulate and lose about the same amount of whey by gradiently ranging the temperature in said chamber from 86° to 200° F., bottom to top; and (c) providing means for facilitating separation of the remaining whey from the curd and eliminating the step of cutting the curd to effect exudation of the whey by collecting the curd in the form of a synerized thin layer of discrete, uniformly-sized, ball-shaped particles of predetermined size.

References Cited

UNITED STATES PATENTS

| | | | |
|---|---|---|---|
| 2,997,395 | 8/1961 | Berridge | 99—116 |
| 2,228,151 | 1/1941 | Oberg | 260—120 |
| 3,528,821 | 9/1970 | Stenne | 99—116 |
| 917,062 | 4/1909 | Head | 99—20 X |

DAVID M. NAFF, Primary Examiner

UNITED STATES PATENT OFFICE
CERTIFICATE OF CORRECTION

Patent No. 3,748,149          Dated   July 24, 1973

Inventor(s)   Homer E. Walter et al.

It is certified that error appears in the above-identified patent and that said Letters Patent are hereby corrected as shown below:

Insert the attached sheet as part of the

Letters Patent 3,748,149.

Signed and sealed this 27th day of August 1974.

(SEAL)
Attest:

McCOY M. GIBSON, JR.                C. MARSHALL DANN
Attesting Officer                   Commissioner of Patents